3,376,959
AUTOMATIC BRAKE ADJUSTER MECHANISM
Orla L. Holcomb, Jr., and Frank F. Hartman, South Bend, Ind., assignors to The Bendix Corporation, a corporation of Delaware
Filed Sept. 6, 1966, Ser. No. 577,281
7 Claims. (Cl. 188—196)

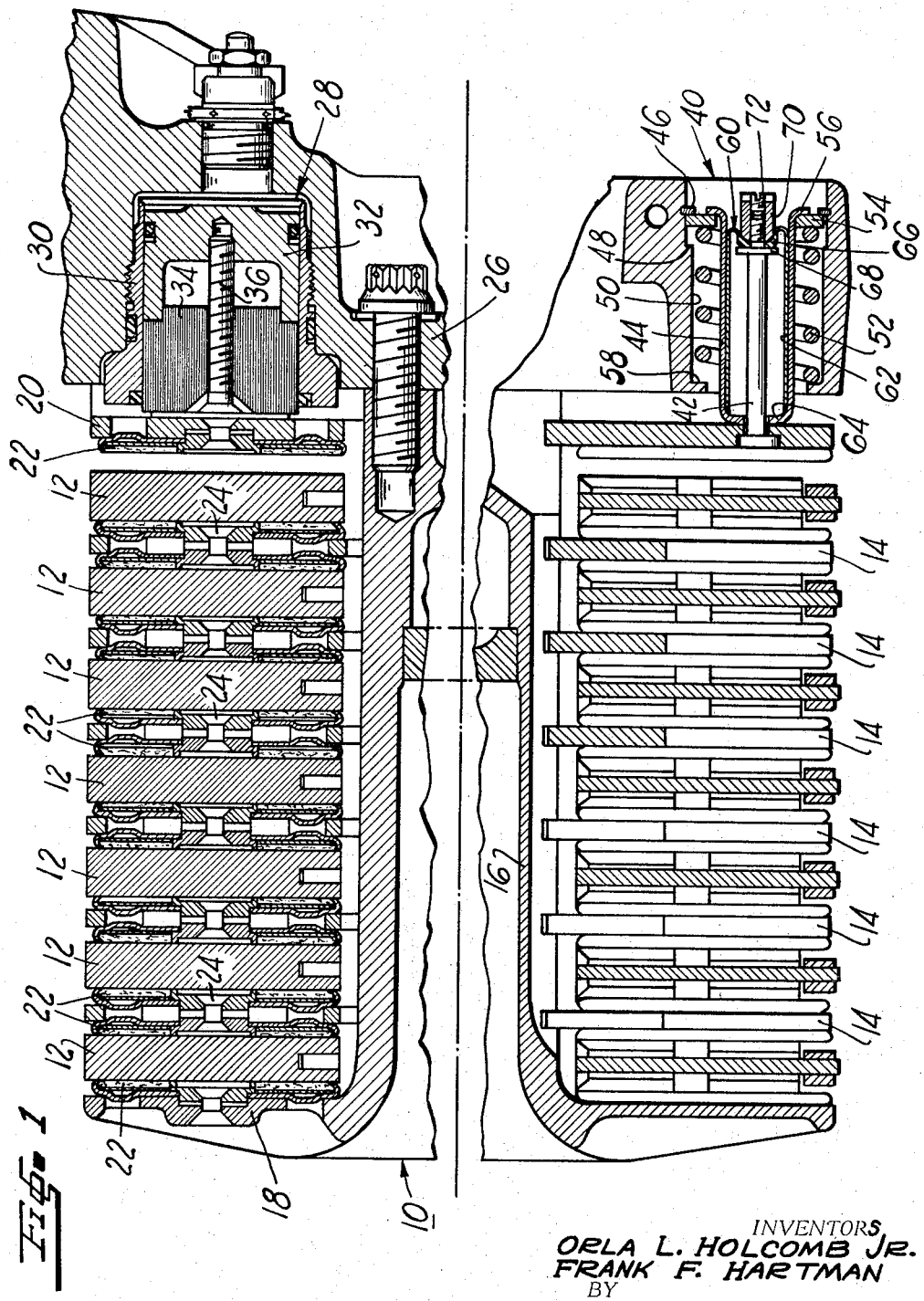

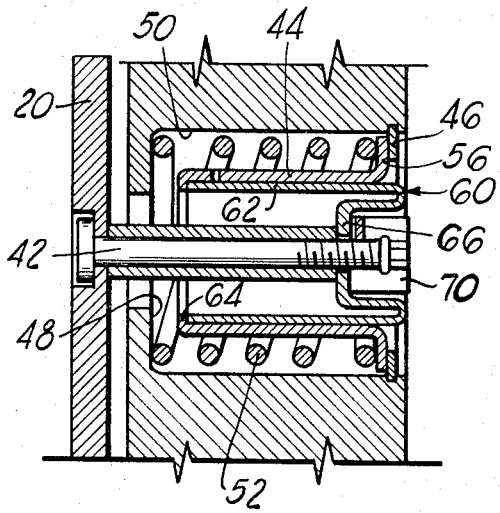
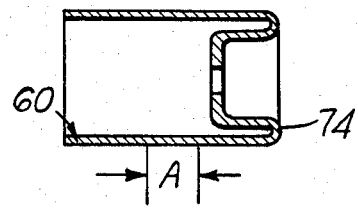
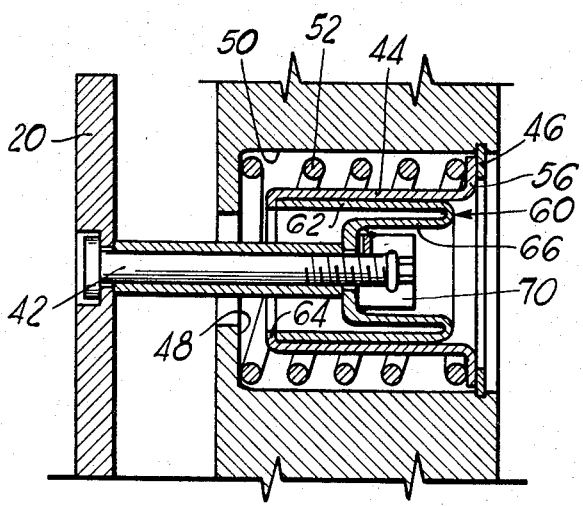

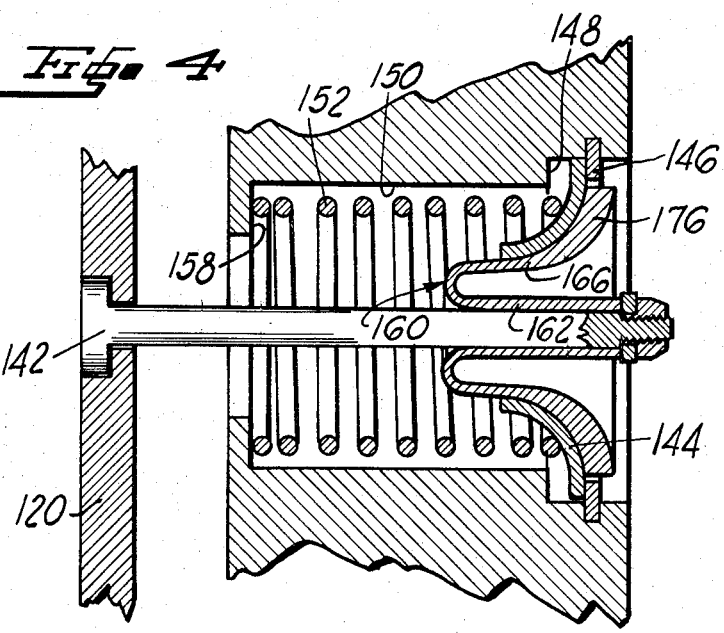
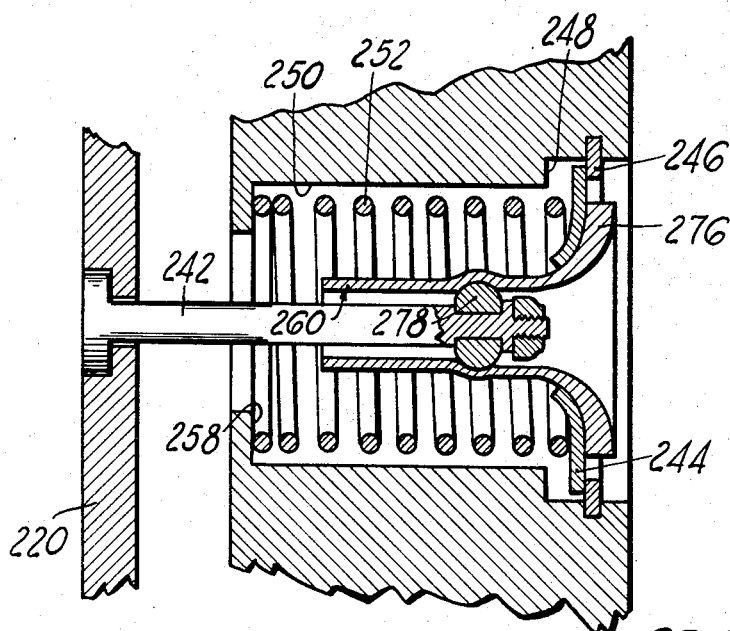
INVENTORS
ORLA L. HOLCOMB JR.
FRANK F. HARTMAN
BY
William N. Antonis
ATTORNEY United States Patent Office 3,376,959
Patented Apr. 9, 1968

ABSTRACT OF THE DISCLOSURE

An automatic brake adjuster mechanism having permanently deformable means therein which is capable of assuming a new shape and position during a brake application to determine the proper release position of the pressure plate for the next brake application. The deformable means can be a ductile deformable tubular member which can invert from a large diameter to a small diameter (or vice versa), or a ductile deformable tubular member which can be deformed by movement of an expander button located therein.

This invention relates to brakes and, more particularly, to an automatic brake adjuster mechanism for use in connection therewith.

The invention will be described in conjunction with a disc type brake in which laterally movable relatively rotatable friction members are forceably engaged during a brake application. It will be appreciated, however, that the invention is usable not only with brakes of this general construction, but also with other braking devices.

In the construction of the typical disc type brake, there is provided a number of interleaved rotor and stator members, some of which are lined with suitable friction material. At one side of the "stack" of rotors and stators is a fixed backing plate against which the stack of rotors and stators is thrust, and at the opposite side of the stack is a pressure plate which bears against the stack of rotors and stators and presses them together and against the backing plate. The rotors, stators and the pressure plate are all axially movable to permit their inter-engagement. Since the pressure plate has the maximum axial movement, adjustment of the release position of this plate is, in effect, an adjustment of the brake as a whole.

Accordingly, it is an object of this invention to provide a brake adjuster mechanism which will automatically adjust the position of the pressure plate for the next brake application.

Another object of this invention is to provide an automatic brake adjuster mechanism which will be particularly efficient and reliable in operation and yet simple in construction.

A further object of this invention is to provide an automatic adjuster having a return spring therein which will retain the length and force of the return spring substantially constant regardless of the extent of adjustment. In other words, the length of the return spring in the released or retracted position and, therefore, the force required to compress the spring will remain substantially the same regardless of the release position of the pressure plate.

More specifically, it is an object of this invention to provide an automatic brake adjuster mechanism having a permanently deformable member therein which is capable of assuming a new shape and position during a brake application to determine the proper release position of the pressure plate for the next brake application.

A further object of this invention is to provide an automatic brake adjuster mechanism which not only provides constant running clearance in a disc or shoe type friction brake but, in addition, provides a visual indication of the accumulated wear of the braking components.

The above and other objects and features of the invention will become apparent from the following description of the mechanism taken in connection with the accompanying drawings which form a part of this disclosure and in which:

FIGURE 1 is a fragmentary axial sectional view taken through a disc brake incorporating the invention;

FIGURE 2 is an enlarged sectional view of an automatic brake adjuster mechanism similar to that shown in FIGURE 1 with the pressure plate shown in its original position;

FIGURE 2a shows a deformable adjuster tube removed from the automatic brake adjuster mechanism shown in FIGURE 2;

FIGURE 3 is a sectional view similar to that of FIGURE 2 with the pressure plate shown in an adjusted position after the brake has been in use for an extended period;

FIGURE 4 is a sectional view of another embodiment of an automatic brake adjuster mechanism incorporating the invention; and FIGURE 5 is a still further embodiment of an automatic brake adjuster mechanism incorporating the invention.

Referring to FIGURE 1, it will be seen that the numeral 10 designates generally an aircraft brake of the disc type construction. The brake consists of a plurality of interleaved rotors 12, which are splined to and are rotated by the aircraft wheel (not shown), and stators 14, which are splined to a non-rotatable torque tube 16. Both the rotors and stators are movable axially and are sometimes referred to as a brake "stack." It is the frictional engagement of these relatively rotatable rotors and stators which produces the braking action on the aircraft wheel. At one side of the stack is an upturned flange 18 of the torque tube 16 which is hereinafter referred to as a backing plate. At the other side of the stack is a pressure plate 20, the purpose of which is to clamp the rotors 12 and stators 14 together by thrusting at one side of the stack and biasing the entire stack against the backing plate 18.

Pressure plate 20, each of the stators 14 and the backing plate 18 have friction material lining 22 provided thereon. The lining is often formed in segments and is individually attached by rivets 24, or the like, to its associated mounting structure. Neither the composition, arrangement, nor mounting of the friction segments forms an essential part of the present invention.

Adjacent the pressure plate 20 is a carrier plate 26 which is connected to the axle (not shown) through any suitable means. The carrier contains a plurality of fluid motors 28 (only one of which is shown) each of which includes a protective sleeve 30 threaded to the carrier, and a piston 32 located and slidable in the sleeve. A block of insulating material 34 is secured to the head end of the piston by a threaded pin 36 for protecting the hydraulic brake fluid from the heat generated during braking.

Also mounted on the carrier plate 26 is a plurality of automatic brake adjuster mechanisms designated generally by the reference numeral 40. Each adjuster mechanism includes an axially extending pin type positioning member 42 which is suitably secured to the pressure plate 20. An axially movable sleeve type spring follower 44 is movable between a first fixed stop means formed by a retaining ring 46 and a second stop formed by a shoulder 48 of bore 50. A return spring 52 is located in bore 50 and is compressed between a washer 54, which abuts a flange 56 of the spring follower, and a second shoulder 58 formed in bore 50. Located within the sleeve type spring follower is a deformable ductile tubular member 60 having a cylindrical portion 62 which abuts flange 64 of spring follower 44 and an inverted portion 66 which is suitably attached to the axially extending pin type positioning member 42 through means of a fixed washer 68, sleeve nut 70 and set screw 72. The deformable tubular member 60 can be formed of aluminum, nickel, copper or any other suitable ductile material.

Referring to FIGURES 2 and 3, wherein the adjuster mechanism of FIGURE 1 is schematically illustrated and wherein like parts are designated by like numerals, it will be seen that upon movement of the pressure plate 20 through actuation of the fluid motors 28, the deformable ductile tubular member 60 will permit concomitant and equal axial movement of the pin 42 and the spring follower member 44 during the brake application until the follower member has moved from the first stop 46 to the second stop 48, at which time continued independent axial movement of the pressure plate and pin 42 will cause the deformable tubular member 60 to invert further from a large diameter to a smaller diameter, as shown in FIGURE 3, so that the axial relationship between the pressure plate 20 and the follower member 44 will be properly adjusted for the next brake application.

Thus, the running clearance, that is, the amount of return travel of the pressure plate 20 after release of the braking force, is determined by the available travel of the spring follower 44 between the first and second stops 46 and 48, respectively. Therefore, as the braking components wear, the pressure plate travel will exceed that which is available to the spring follower. This difference in travel is absorbed by the deformable adjuster tube 60 through the mechanics of material yielding as the tube is inverted within itself. The force necessary to invert the deformable tube will, of course, be greater than that exerted by the return spring 52 by a suitable margin. Upon release of the braking pressure, the return spring will retract the pressure plate only the distance which the spring follower can move from the second stop 48 to the first stop 46. In this manner, the mechanism automatically provides for a constant running clearance in the brake.

If a visual display of the accumulated wear of the braking components is desired, the outside diameter of the adjuster tube can be color coded so that the color exposed at the inflection point of the tube indicates the degree of wear and/or the necessity for overhaul or replacement of the braking components. For instance, referring to FIGURE 2a which shows the deformable adjuster tube 60 removed from the mechanism, it will be seen that an area A could be colored red. As the friction components of the brake wear, the inflection point 74 of the deformable tube will move towards the area A as the tubular member inverts and will be coincident with the area A when the brake components have completed their useful life.

In FIGURE 4, which shows another embodiment of the invention, like numbers plus 100 designate like parts. In this instance, the inverting tube adjuster 160 inverts from a small diameter to a larger diameter instead of from a large to a smaller diameter as in the previous embodiment. However, the principle of operation is exactly the same as in the previous embodiment. It will be noted that the positioning pin 142 is suitably connected to the pressure plate 120 at one end and to the cylindrical portion 162 of the deformable tubular member 160 at the other end. The deformable ductile tubular member is formed with a flared end 176 which abuts the spring follower 144. The spring follower, which is movable between a first stop 146 and a second stop 148, is urged against the flared end of the tubular member by return spring 152.

The foregoing two automatic adjuster embodiments are characterized in that they: (a) are not dependent upon frictional forces, thus requiring a lower margin of inverting force over spring force to thereby achieve a higher brake efficiency, (b) are not susceptible to environmental conditions of oil and dust, (c) are of a design which will permit the use of an easily manufactured extruded deformable adjuster tube, and (d) are easily replaceable.

FIGURE 5, which shows a third embodiment of this invention, is described by utilizing like numerals plus 200 with respect to like parts. In this particular version, a spring follower 244 is movable between a first stop 246 and a second stop 248. A return spring 252 urges the spring follower against the first stop. The positioning member 242 is suitably connected to the pressure plate 220 and has an annular or other suitably shaped expander button 278 secured to the opposite end thereof. This expander button is located within and in frictional engagement with the deformable adjuster tube 260. The deformable adjuster tube can be formed, as in the previous instances, of aluminum, nickel, copper or any other suitable ductile material which can be expanded by movement of the expander button as the pressure plate travel exceeds the running clearance between the first and second stops 246 and 248. The pull through force will be determined by the amount of expansion imposed and the yield strength of the adjuster tube material. The shape of the button is designed to minimize the effects of friction by minimizing the amount of material at maximum stress level. If desired, the adjuster tube 260 can be impact extruded and can also be coated with Teflon in order to reduce the frictional effects. The adjuster tube is flared at one end 276 so as to abut the spring follower 244 which can be formed of steel to prevent plastic bending deformation of the adjuster tube 260. The spring follower can be produced by stamping. In this particular embodiment it will be understood that upon continued independent axial movement of the pin 142 and button 278, after the follower member has contacted the second stop 148, the button 278 will cause the deformable tubular member to expand around and lock said button in position so that the pressure plate 220 will likewise be in the proper position for the next brake application.

The several practical advantages which flow from the above described invention are believed to be obvious and other advantages may suggest themselves to those who are familiar with the art to which this invention relates.

Furthermore, although this invention has been described in connection with certain specific embodiments, it will be obvious to those skilled in the art that various changes may be made in the form, structure and arrangement of components without departing from the spirit of the invention. Accordingly, we do not desire to be limited to the specific embodiments disclosed herein primarily for purposes of illustration, but instead desire protection falling within the scope of the appended claims.

Having thus described the various features of the invention, what we claim as new and desire to secure by Letters Patent is:

1. In a brake having an axially fixed member and an axially movable member which moves a distance at least partially dependent upon the amount of brake wear, an automatic adjuster mechanism for automatically changing the released position of said axially movable member to maintain a substantially constant brake clearance comprising an axially extending pin-type positioning member secured to said axially movable member, spring-follower means axially movable between first and second fixed stop means located on said fixed member, return spring means compressed between said spring follower means and fixed abutment means carried by said fixed member, and a ductile deformable tubular member telescoped over said positioning member and operatively connected thereto and to said spring follower means for permitting concomitant and equal axial movement of said positioning member and said follower means during a brake application until said follower means has moved from said first to said second stop means and continued independent axial movement of said positioning member thereafter, said deformable tubular member having a substantially cylindrical portion and an inverted portion, one of said portions being operatively connected to said axially extending pin-type positioning member and the other of said portions being operatively connected to said follower means, said continued indepedent axial movement of said positioning member after contact of said follower means with said second stop means causing permanent deformation of said deformable tubular member so that the axial relationship between said positioning member and said follower means will be changed for the next brake application.

2. The structure, as defined in claim 1, wherein independent axial movement of said axially extending pin type positioning member after contact of said follower means with said second stop means causes progressive inversion of said deformable tubular member and progressive movement of the inflection point between the substantially cylindrical and inverted portions of said tubular member.

3. The structure, as defined in claim 2, wherein said deformable tubular member inverts from a large diameter to a small diameter.

4. The structure, as defined in claim 2, wherein said deformable tubular member inverts from a small diameter to a larger diameter.

5. The structure, as defined in claim 3, wherein the outside diameter of said deformable tubular member is color coded so that the color exposed at said inflection point indicates the degree of wear of said brake.

6. In a brake having an axially fixed member and an axially movable member which moves a distance at least partially dependent upon the amount of brake wear, an automatic adjuster mechanism for automatically changing the released position of said axially movable member to maintain a substantially constant brake clearance comprising an axially extending pin-type positioning member secured to said axially movable member, spring follower means axially movable between first and second fixed stop means located on said fixed member, return spring means compressed between said spring follower means and fixed abutment means carried by said fixed member, a ductile deformable tubular member telescoped over said positioning member and operatively connected thereto and to said spring follower means for permitting concomitant and equal axial movement of said positioning member and said follower means during a brake application until said follower means has moved from said first to said second stop means and continued independent axial movement of said positioning member thereafter, said continued indepedent axial movement of said positioning member after contact of said follower means with said second stop means causing permanent deformation of said deformable tubular member so that the axial relationship between said positioning member and said follower means will be changed for the next brake application, and expander means secured to said axially extending pin-type positioning member and located within and in frictional engagement with said deformable tubular member, said expander means comprising a rounded button slightly greater than the inner diameter of said deformable tubular member which upon continued independent axial movement of said pin-type positioning member and button after contact of said follower means with said second stop means causes said tubular member to expand elastically and plastically around and lock said button in position for the next brake application.

7. The structure, as defined in claim 6, wherein said deformable member is flared at one end and abuts said follower means.

References Cited
UNITED STATES PATENTS

| | | | |
|---|---|---|---|
| 2,886,140 | 5/1959 | Trevaskis | 188—196 X |
| 3,286,795 | 11/1966 | Barrett et al. | 188—72 |

DUANE A. REGER, *Primary Examiner.*